United States Patent [19]
Snyder et al.

[11] Patent Number: 5,907,495
[45] Date of Patent: May 25, 1999

[54] METHOD OF FORMULATING PAINT THROUGH COLOR SPACE MODELING

[75] Inventors: Daniel Loyce Snyder, Columbia; Walter Keith Hammock, Franklin; Jonathan A. Wallus, Brentwood, all of Tenn.

[73] Assignee: General Motors Corporation, Detroit, Mich.

[21] Appl. No.: 08/883,945

[22] Filed: Jun. 27, 1997

[51] Int. Cl.$^6$ .................................. G01J 3/46; G06G 7/48
[52] U.S. Cl. .......................... 364/578; 356/405; 358/529
[58] Field of Search ............................... 358/529; 206/81

[56] References Cited

U.S. PATENT DOCUMENTS

| | | | |
|---|---|---|---|
| 3,601,589 | 8/1971 | McCarty | 382/165 |
| 3,690,771 | 9/1972 | Armstrong, Jr. et al. | 356/176 |
| 3,916,168 | 10/1975 | McCarty et al. | 356/405 |
| 4,635,213 | 1/1987 | Murata et al. | 382/111 |
| 4,887,906 | 12/1989 | Koehler | 356/402 |
| 4,941,038 | 7/1990 | Walowit | 358/518 |
| 4,972,257 | 11/1990 | Birnbaum et al. | 358/520 |
| 5,023,814 | 6/1991 | Guillemin | 382/162 |
| 5,231,472 | 7/1993 | Marcus et al. | 356/402 |
| 5,446,681 | 8/1995 | Gethner et al. | 702/27 |
| 5,537,516 | 7/1996 | Sherman et al. | 395/109 |

*Primary Examiner*—Kevin J. Teska
*Assistant Examiner*—Hugh Jones
*Attorney, Agent, or Firm*—Vincent A. Cichosz

[57] ABSTRACT

Color space models are developed using designed experiments of pigment and binder ratios of a plurality known paint formulations for correlating color coordinates in a three-dimensional color space and paint constituents. Capabilities of the paints are determined by limits placed upon the constituents. Each color space model is used to return respective constituent apportionments for achieving predetermined color coordinates. Constituent apportionments within the respective limits correspond to paint formulations within the color space capability of the corresponding known paint formulation. When all such respective constituent apportionments are within the respective limits for each known paint formulation, the predetermined color coordinates are achievable and within a common color space capability of the known paint formulations.

7 Claims, 6 Drawing Sheets

| SAMPLE | CONSTITUENTS | | | | | COLOR COORDINATES | | | | | | | | |
|---|---|---|---|---|---|---|---|---|---|---|---|---|---|---|
| | | | | | | 75° | | | 45° | | | 25° | | |
| # | $C_1$ | $C_2$ | $C_3$ | ... | $C_n$ | $L^*$ | $a^*$ | $b^*$ | $L^*$ | $a^*$ | $b^*$ | $L^*$ | $a^*$ | $b^*$ |
| $S_1$ | | | | | | | | | | | | | | |
| $S_2$ | | | | | | | | | | | | | | |
| $S_3$ | | | | | | | | | | | | | | |
| $S_4$ | | | | | | | | | | | | | | |
| $S_X$ | | | | ... | | | | | | | | | | |

FIG. 7

|   | A | B | C | D | E | F | G | H | I | J | K | L |
|---|---|---|---|---|---|---|---|---|---|---|---|---|
| 1 | | | | | | | | | | | | |
| 2 | | | | PIG1 | PIG2 | PIG3 | PIG4 | PIG5 | | | | |
| 3 | | | Formulation Data 25 | $C1_{25}$ | $C2_{25}$ | $C3_{25}$ | $C4_{25}$ | $C5_{25}$ | | | | |
| 4 | | | Formulation Data 45 | $C1_{45}$ | $C2_{45}$ | $C3_{45}$ | $C4_{45}$ | $C5_{45}$ | | | | |
| 5 | | | Formulation Data 75 | $C1_{75}$ | $C2_{75}$ | $C3_{75}$ | $C4_{75}$ | $C5_{75}$ | | | | |
| 6 | | | Upper Pi:P Constraint | $(p_1:P)u$ | $(p_2:P)u$ | $(p_3:P)u$ | $(p_4:P)u$ | $(p_5:P)u$ | | | | |
| 7 | | | Lower Pi:P Constraint | $(p_1:P)l$ | $(p_2:P)l$ | $(p_3:P)l$ | $(p_4:P)l$ | $(p_5:P)l$ | | | | |
| 8 | | | | | | | | | | L*a*b* Constraint | C/S Model Equations | |
| 9 | | | K | k1 | k2 | k3 | k4 | k5 | | | | |
| 10 | 25 | L* | $K_{L25}$ | $k1_{L25}$ | $k2_{L25}$ | $k3_{L25}$ | $k4_{L25}$ | $k5_{L25}$ | | $L^*_{25}$ | <= Solver Target |
| 11 | | a* | $K_{a25}$ | $k1_{a25}$ | $k2_{a25}$ | $k3_{a25}$ | $k4_{a25}$ | $k5_{a25}$ | | Desired $a^*_{25}$ | $a^*_{25}$ | |
| 12 | | b* | $K_{b25}$ | $k1_{b25}$ | $k2_{b25}$ | $k3_{b25}$ | $k4_{b25}$ | $k5_{b25}$ | | Desired $b^*_{25}$ | $b^*_{25}$ | |
| 13 | 45 | L* | $K_{L45}$ | $k1_{L45}$ | $k2_{L45}$ | $k3_{L45}$ | $k4_{L45}$ | $k5_{L45}$ | | Desired $L^*_{45}$ | $L^*_{45}$ | |
| 14 | | a* | $K_{a45}$ | $k1_{a45}$ | $k2_{a45}$ | $k3_{a45}$ | $k4_{a45}$ | $k5_{a45}$ | | Desired $a^*_{45}$ | $a^*_{45}$ | |
| 15 | | b* | $K_{b45}$ | $k1_{b45}$ | $k2_{b45}$ | $k3_{b45}$ | $k4_{b45}$ | $k5_{b45}$ | | Desired $b^*_{45}$ | $b^*_{45}$ | |
| 16 | 75 | L* | $K_{L75}$ | $k1_{L75}$ | $k2_{L75}$ | $k3_{L75}$ | $k4_{L75}$ | $k5_{L75}$ | | Desired $L^*_{75}$ | $L^*_{75}$ | |
| 17 | | a* | $K_{a75}$ | $k1_{a75}$ | $k2_{a75}$ | $k3_{a75}$ | $k4_{a75}$ | $k5_{a75}$ | | Desired $a^*_{75}$ | $a^*_{75}$ | |
| 18 | | b* | $K_{b75}$ | $k1_{b75}$ | $k2_{b75}$ | $k3_{b75}$ | $k4_{b75}$ | $k5_{b75}$ | | Desired $b^*_{75}$ | $b^*_{75}$ | |

METHOD OF FORMULATING PAINT THROUGH COLOR SPACE MODELING

TECHNICAL FIELD

The present invention relates to pigmented surface coating technology.

BACKGROUND OF THE INVENTION

Pigmented surface coating, or paint technology, is widely employed in the automotive industry. Original equipment manufacturers, including vehicle assemblers and suppliers, consume tremendous quantities of paints, the majority of which are applied to interior trim components, exterior body panels and other visibly exposed surfaces. While the varieties of paint technologies are numerous, perhaps the most widespread general variety includes liquid paints comprising pigments carried in a binder base. Other varieties include powder coatings including epoxy paints.

Automotive applications present a variety of challenges to paint technology. Apart from the physical performance objectives such as durability and application characteristics, consistent color matching capability remains a major challenge. This challenge is particularly acute in modern day automotive assembly plants where painted components arrive from various locations in pre-painted condition for final assembly with other remotely painted components to a vehicle having panels and major surfaces painted in an on-site paint facility. Even the on-site paint facility may produce panels which are preferably treated as fungible components for retrieval and assembly to the vehicle without regard for particular paint production runs. Smooth vehicle assembly operations may be significantly hindered by shortfalls in color matching capabilities resulting in subjective component substitution and swapping out of panels in an attempt to achieve an aesthetically pleasing color match among the integrated vehicle components, panels and surfaces.

Additionally, apart from a variety of performance objectives and color matching capability, flexibility to market place demands remains a major challenge. Historically, color preferences tend to run in cycles and when a color loses its appeal or uniqueness, the customer's desires and demands change also. Such color preferences may be fleeting, and by the time a paint is brought to market, the preferences may have changed or waned. Unfortunately, a substantial developmental lead time affects the vehicle manufacturer's response flexibility to the temporal nature of the customer's color preferences. The lead time is generally attributed to pre-production requirements including performance validation testing and other physical properties testing. Also, it is recognized that the paint color selection and release for production process, particularly at the conception stage, relies heavily upon subjective judgment of the paint "alchemists" on how best to achieve a paint formulation for achieving a desired color.

SUMMARY OF THE INVENTION

The present invention determines a paint formulation using a set of paint constituents for producing a paint characterized by desired color coordinates in a three-dimensional color space. A number of paint samples are provided by mixing paint samples having diverse ratios of pigments and, in some instances diverse ratios of pigment to binder. Test panels are sprayed out using the paint samples and color measurements are made from each panel. The color measurements are in the form of color coordinates of the paint color as it relates to a three-dimensional color space. A preferred color space and coordinate system is the CIE L*a*b* color space. The apportionments of the constituents and the color coordinates for all of the test panels are correlated such as through regression analysis and a relational model characterized by correlation of the constituents to color coordinates results. The relational model is then used to output apportionment of the constituents corresponding to desired color coordinates. The constituent apportionments returned by the model comprise the paint formulation for producing the paint exhibiting the desired color coordinates.

In accordance with a preferred aspect of the invention, the apportionments of constituents for the paint samples correspond to paint formulations satisfying predetermined performance criteria.

In accordance with another aspect of the invention, the predetermined set of constituents is limited to constituents in a pre-existing paint formulation.

In accordance with yet another aspect of the present invention, the paint samples are yielded by performance of a two-level mixture experiment for determining the respective diverse constituent apportionment data for production of the paint samples.

Multiple diverse paint formulations exhibiting common color coordinates may be derived from diverse sets of paint constituents in areas of common color space in accordance with another aspect of the invention. In such cases, multiple color space models are developed and respective constituent apportionments returned from each corresponding to common desired color coordinates. All such constituent apportionments which are within the limits of the respective models correspond to paint formulations for achieving the desired color coordinates with the respective paint constituents.

BRIEF DESCRIPTION OF THE DRAWINGS

FIG. 7 is an exemplary spreadsheet application for recursively optimizing pigment formulation of paint from predetermined color space model equations; and, FIG. 8 is representative of preferred constraints and demonstrative parameters used in recursively optimizing pigment formulation of paint from predetermined color space model equations in accordance with the exemplary spreadsheet application of FIG. 7.

DESCRIPTION OF THE PREFERRED EMBODIMENT

Figure 1:
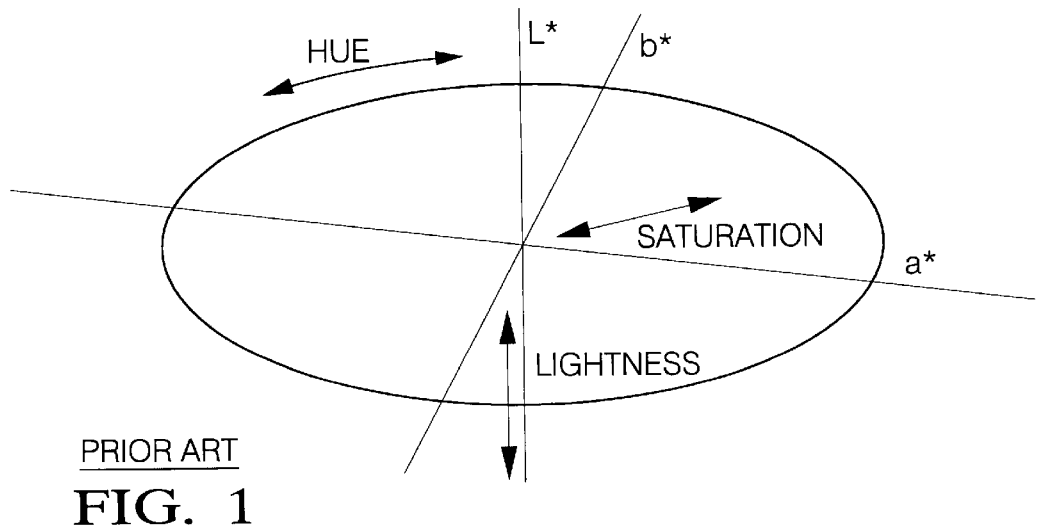
FIG. 1 represents a standard CIEL*a*b* three-dimensional color space.

With reference first to FIG. 1, a three-dimensional representation of color space is illustrated. The color space representation is the familiar CIE L*a*b* uniform Cartesian-coordinate color space standard promulgated by the *Commission Internationale de l'Enclairage* (International Commission on Illumination) and based upon well known cube root functions of tristimulus values (X,Y, Z) of colors derived from the response of the average human or the so called "standard observer." The L*a*b* color space is generally well accepted and is generally used in self-referenced tolerancing of colors. The present invention makes use of the L*a*b* color space standards and representations in carrying out the functions to be described though other color space standards and representations may be utilized. For example, at least one other color space coordinate systems (L*C*H*) based upon the L*a*b* color space is well known and provides an alternative standard used in self-referenced color tolerancing applications. The L*C*H* color space is represented by polar coordinates in the L* plane which are derived from the Cartesian coordinates along the a* and b* axes in the L*a*b* color space.

Regardless of the color space coordinate system utilized, it is generally well accepted that the three-dimensional color space can be used to define colors in terms of certain color characteristics or color attributes. The axis labeled L* in the figure represents a scale of luminous intensity or degree of lightness attribute. The axis labeled a* represents a scale of red/green appearance and the orthogonal axis b* represents a scale of yellow/blue appearance. The information contained in the combination of a color's a*-b* axes position represents the chromatic attributes known as hue and saturation. The hue varies with the position about the L* axis and the saturation changes with the distance from the L* axis. Therefore, a complete set or group of color attributes, or the attributes' defining coordinates comprising lightness (L*), red/green (a*), and yellow/blue (b*) in the L*a*b* color space, fully defines a color point or locus in the color space. When generally used herein, the term color shall be understood to be fully defined by one or more complete sets or groups of color attributes or corresponding coordinates considering all three dimensions or axes in a three dimensional color space.

A variety of instrumentation is known for measuring light reflected from samples and providing data representing the sample's color attributes. One such general variety of device is a spectrophotometer which includes a light source, filters, photodetectors and processing circuitry for providing numerical values indicative of the color coordinates of the color measured. More sophisticated spectrophotometers include such features as multiple angle measurement, statistical, programming, and data storage and communication capabilities. In practicing the present invention, and particularly with respect to development of color space models as described at a later point herein, the commercially available multi-angle spectrophotometer commonly designated as MA68 available from X-Rite®, Incorporated, Grandeville, Mich. was employed in the measurements of color samples. With respect to modern automotive paints containing "metallic" constituents which may significantly influence color attributes as a function of viewing angle or travel, multi-angle capability of a spectrophotometer utilized in practicing the present invention is considered to be desirable.

Though paint technologies may vary substantially, significant similarities exist such that the present invention may be described without respect to specific paint technology. Generally, pigmented finish paints such as base coats of a base coat/clear coat combination, may be broken down into the resin binder, typically an acrylic vehicle, and pigments including so called metal particles. The resin binder and various pigments may commonly be referred to herein without distinction as constituents, paint constituents or similar nomenclature. In an even more general sense, the term constituent when used herein refers to any singly differentiable component in the paint formulation or an integration of such components when treated as an independent medium.

In accordance with one aspect of the present invention, a desired automotive paint color is characterized in terms of one or more color coordinates. A desired paint color may be selected, for example, from a physical sample such as a painted panel or through a graphical color space visualization technique. In the former example, a production or show vehicle color may be measured with a spectrophotometer to return at least one group of color coordinates. In the latter example, a three-dimensional plot in the color space of current, historical and/or potential color utilization is used to select a desired paint color. This latter tool may be of great assistance in the selection process since the general distribution of historic colors may be presented in an understandable, organized format. The desired color may then be selected by positioning a desired color locus relative to the three-dimensional axes system of the color space and differentiating the point into the group of three color characteristics or attributes associated therewith. The positioning of the desired color locus may, for example, be performed in accordance with the objective of infiltrating a sparsely populated region of color space, exploiting variations within a more densely populated region of color space, or tracking trends in color preferences. In accordance with another aspect of the present invention, the positioning of the desired color locus through the graphical color space visualization technique affords the opportunity to leverage known paint formulations in formulating a desired paint color through strategic positioning of the color locus relative to the color locus of one or more known paint formulations.

Figure 6:
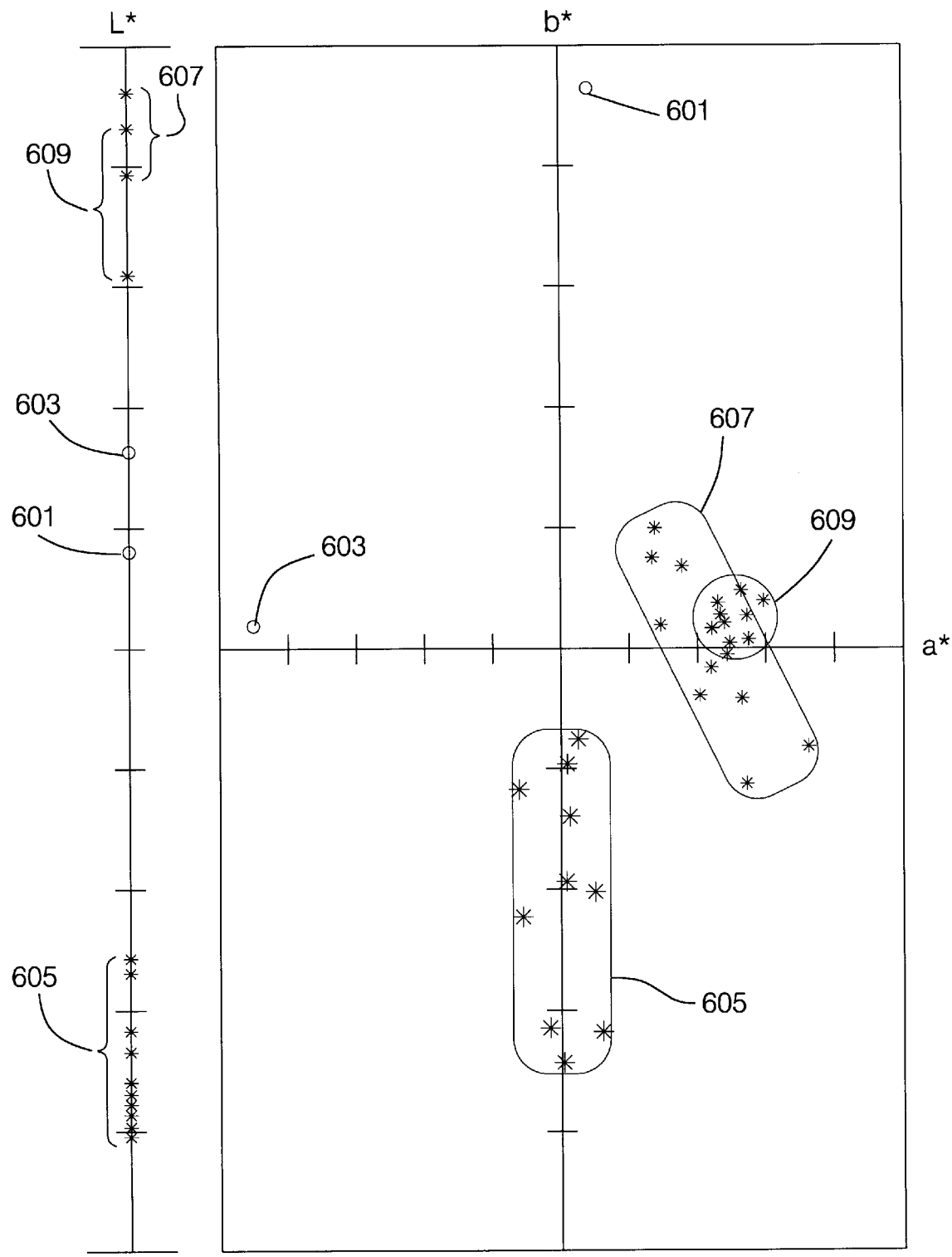
FIG. 6 is a graphical color space visualization tool utilized in accordance with the present invention.

An exemplary graphical tool for color space visualization is illustrated in FIG. 6. The vertically elongated portion left in the figure represents the one-dimensional lightness L* scale in the L*a*b* color space. The larger portion right in the figure represent a view through the color space axially from one end of the lightness L* scale to the other. Hence the view is normal to the two-dimensional red/green (a*)—yellow/blue (b*) planes and encompasses the full depth of the L*a*b* color space along the L* axis. The a*-b* portion is therefore essentially equivalent to a graphical representation of only the chromatic attributes (i.e. hue and saturation) positioning in the three-dimensional L*a*b* color space and, though containing chromatic attributes of colors of varying lightness coordinates L*, is referred to as the chromatic area. A given color as differentiated into its corresponding L*a*b* color coordinates, and particularly for an arbitrary standard illumination and viewing angle, may be plotted by two points in a graphic tool as shown in the figure. The L* value is plotted along the L* axis and the (a*,b*) coordinate within the chromatic area.

Since stretching a color along the lightness axis L* is generally a readily accomplishable task in automotive paint technologies, the chromatic area is considered to be of most import in visualizing color points, current and historical color distributions, color space boundaries, and color trends. Also, in terms of leveraging certain colors and identifying common or shared color space opportunities, the chromatic area graphical representation is also considered to be satisfactory in graphically aiding in the understanding of color space overlap. The lightness scale is, however, useful in visualizing a general distribution of the chromatic attributes of a color space in whatever manner may be most convenient. For example, individual L* coordinates may be individually plotted along the scale such as is shown with respect to individual color points alone or as part of a color space, or general distribution bands may be indicated between extreme lightness attributes of particular color spaces as is shown with respect to overlapping color spaces.

FIG. 6 illustrates various non-exhaustive examples of using the graphical visualization technique described herein. Individual colors, for example representing a current distribution or historical distribution of colors may be plotted as individual color points. For clarity, only two such examples are shown by the circles labeled 601 and 603 corresponding to beige and light green, respectively. The circles appear in both the chromatic area and on the lightness scale. It can be appreciated that by similarly plotting numerous color points corresponding to current and historical color usages, underutilized regions of color space may be made visible, niche regions of more popular regions may be made visible and/or color trends may become apparent. The concept of a color space capability is introduced here and may be visualized in the example labeled 605 in the figure. The region generally enclosed by the boundary 605 corresponds to a portion of the chromatic area generally delimited by a plurality of related color coordinates plotted as asterisks (*). The relatedness of the color coordinates comes from a set of common constituents of a known paint formulation. The color coordinates themselves are derived as later described herein. The L* coordinate corresponding to each of the plurality of related color coordinates are individually plotted along the lightness scale, the bracketed lineal region labeled 605 representing their distribution along the lightness scale. Another example utilizing the concept of color space capability, and one useful in visualizing a common color space capability between two or more known paint formulations is described with respect to boundaries labeled 607 and 609. Each boundary corresponds to a portion of the chromatic area generally delimited by a respective plurality of related color coordinates plotted as asterisks (*). Each respective maximum and minimum lightness coordinates L* from the plurality of related color coordinates'L* coordinates are individually plotted along the lightness scale, the bracketed lineal regions labeled 607 and 609 representing the respective distributions along the lightness scale. The overlapping areas of the boundaries 607 and 609 in the chromatic area and the overlapping portion of the lineal regions 607 and 609 on the lightness scale correspond to a color space region within the capability of each of the two paint formulations used to independently derive the respective color space capabilities.

Figure 2:
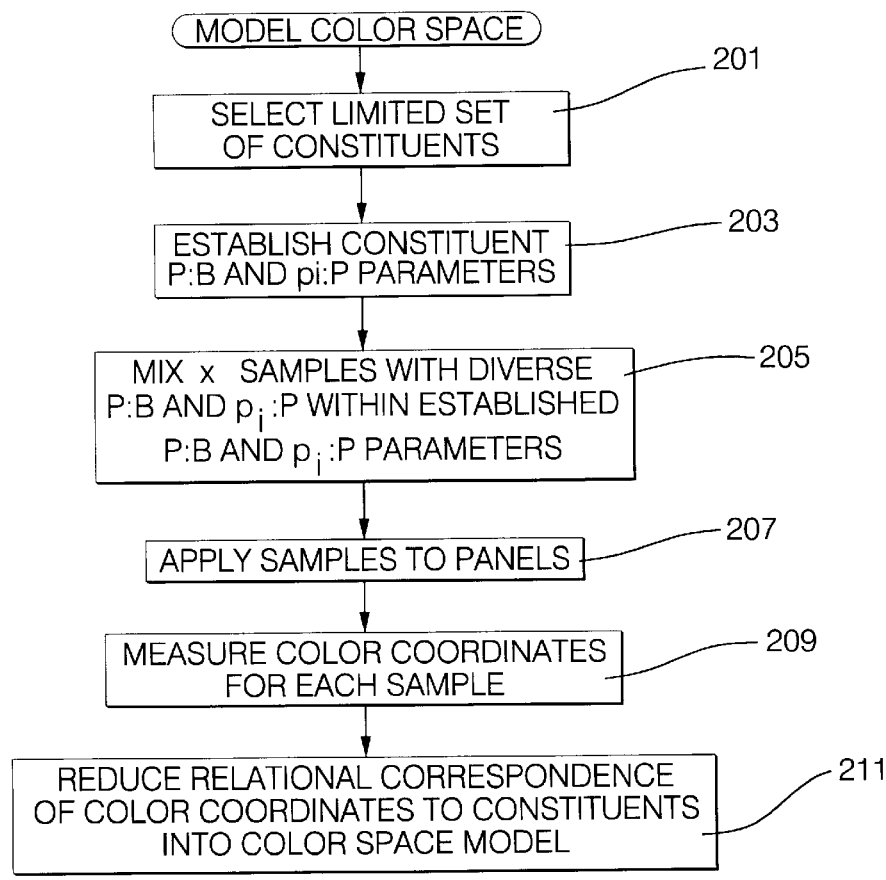
FIG. 2 is a procedural flow diagram of development of a color space model in accordance with the present invention.

The first general procedure in carrying out the present invention is establishing a color space model. With reference to FIG. 2, a set of steps in flow chart format is illustrated for developing a color space model. The principles of classical design of experiments (DOE), and particularly of two-level mixture experiments, are employed in the development of a preferred color space model as described below. Advantageously, commercially available personal computer software applications provide convenient tools for statistical data analysis as described at a later point.

Block 201 represents the selection of the set of paint constituents—the DOE factors—which will be used in the model development and ultimately from which any paint formulation will be established from the model. Selection of the constituents may include making an election of an appropriate binder from the variety of binders available. In the automotive paint field, the typical binder may comprise an acrylic vehicle. Though a binder is itself differentiable into its own set of constituents, it is generally preferred to treat the binder as a single constituent as a given binder's engineered physical properties are generally will understood and may be significantly compromised through ad hoc manipulation. Additionally, though the binders do influence a paint's color locus, they are generally relatively benign or neutral with respect to chromatic content and manipulation of a binder's make up is more likely to detrimentally affect critical physical properties of the paint than to significantly affect the color attributes of the paint. The selection of the remaining constituents which will be used in the model development is generally limited to a general category described as pigments which includes not only compositions predominantly effective to influence chromatic characteristics of the paint but which also includes compositions generally referred to as metallic particles which predominantly affect viewing angle or travel reflective characteristics but which may be manipulated to affect chromatic attributes. Therefore, the color space development in the present example through DOE principles does not contemplate the use of the binder as one of the DOE factors. The term factor or factors as used in the exemplary model development shall be understood to refer to pigments, and when pigments are referred to in the discussion below it is to be understood that they comprise the factors in the DOE unless otherwise stated.

One preferred color space model may be established from a set of known constituents, including binder and pigments, from a known formulation of paint. That is to say, an already established and characteristically understood paint formulation having been developed and perhaps utilized in a production environment may preferably provide the set of known constituents from which the color space model and hence any paint formulation corresponding thereto will be derived. This is a particularly advantageous selection of constituents when the objective is to "freshen" a color for example from one vehicle model year to another. The paint is said to be characteristically understood with respect to certain physical properties and/or performance characteristics in application and field use generally associated with a production released or validated paint, which may include as non-exhaustive examples adhesion characteristics, resistance to sag, high humidity durability, chip resistance, and ultra-violet exposure durability. Paint validation as referred to herein means successful conformance testing of paint against predetermined criteria as well known in the art.

Continuing with the next step of the color space model development, block 203 represents the establishment of pigment to binder ratio (P:B) and pigment ratio ($p_i$:P) parameters. In the representation of FIG. 2 and as used herein, the pigment designation "$p_i$" corresponds to the quantity of the $i^{th}$ individual pigment constituent from the set of n known pigments. The pigment designation "P" corresponds to the sum total of the quantities of all n individual pigments p. This relationship may be expressed as shown below.

$$P = \Sigma_i^n p_i \qquad (1)$$

Therefore, P:B represents the ratio of the summation of the quantities of all individual pigments to the quantity of the binder, whereas $p_i$:P represents the ratio of the quantity of the individual pigments to the summation of the quantities of all individual pigments. The quantities may be expressed as weight, mass, or volume though convention in the art is weight.

The parameters corresponding to P:B and $p_i$:P are limits upon the deviations allowable in the development of the color space model. The P:B parameters may be established with an infinitesimally small differential such that P:B is established as a constant or absolute. That is to say, the color space model in one example may be developed with an invariable P:B ratio. For example, the P:B ratio may be set to the established P:B ratio of the known formulation of paint used in the selection of the limited set of constituents. In such a case, the binder is not considered to be one of the factors in the DOE. This of course leaves only $p_i$:P parameters establishment in deriving the color space model. Alternatively, P:B parameters may be established as any pair of desired ratios representing upper and lower ratio limits. As a practical matter, any parameters established for the P:B would account for certain physical properties of a paint formulated between the P:B parameters selected. For example, though a color space model may be developed with extremely widely spaced P:B parameters, paints formulated tending toward the low P:B parameter $(P:B)_l$ may not have sufficient pigment to adequately hide within an acceptable film build tolerance whereas paints formulated tending toward the high P:B parameter $(P:B)_u$ may not properly homogenize. In either extreme case, at least the application properties of such paints are known to be compromised and generally unacceptable. Therefore, in the color space development in the present example with DOE principles, the P:B is treated as a constant in the development of the color space, or alternately stated, $(P:B)_l = (P:B)_u$.

The $p_i$:P parameters also are established as any pair of desired ratios representing upper and lower ratio limits, $(p_i:P)_u$, $(p_i:P)_l$ for individual pigments. Here, too, as a practical matter, any parameters established for $p_i$:P would account for certain physical properties of a paint formulated with pigment concentrations between respective $p_i$:P parameters selected. For example, pigments vary in their relative opacity or ability to hide. Those pigments with high-hiding characteristics generally have less restriction toward low parameters $(p_i:P)$, than do pigments having low-hiding characteristics generally requiring higher $p_i$:P. Relatively low concentrations of high-hiding pigments may be adequate apart from other pigments in the formulation to provide for desired hiding characteristics at acceptable film builds, whereas even relatively high concentrations of low-hiding pigments may be inadequate notwithstanding other pigments in the formulation to provide for desired hiding characteristics at acceptable film builds. Therefore, it may be acceptable to drop all but one high-hiding pigment out of the total pigment mix P and still attain acceptable hiding from a paint so formulated. In such a case, the upper parameter $(p_i P)_u$ for such a high-hiding pigment may be established at substantially unity and respective ones of the lower $p_i$:P parameters for the other pigments may be established at substantially zero. Similarly, it may be unacceptable to increase a low-hiding pigment beyond some maximum $p_i$:P due to the necessity of maintaining at least a minimum $p_i$:P for some other higher-hiding pigment in order to attain acceptable hiding from a paint formulated from the known constituents. In such a case, the upper parameter $(p_i:P)_u$ for such a low-hiding pigment may be established at less than unity and the lower parameter $(p_i:P)_u$ for at least one of the other pigments may be established at greater than zero The selected upper and lower parameters $(p_i:P)_u$ and $(p_i:P)_l$ for each of the n pigments correspond to the two levels in the two-level DOE. Typically, the two levels selected will correspond to the "acceptable" limits of the particular factor in the experiment (a.k.a. pigment). The acceptability of the two levels may be determined with such considerations as hiding characteristics described above and with other considerations apart from the hiding characteristics. For example, in the example where a known paint formulation provides the starting point for leveraging a color, the two levels for each pigment may be set to a respective limited band symmetrically surrounding the respective known $p_i$:P (e.g. ±30%). Alternatively, as previously described, certain $p_i$:P may in fact be reduced to zero, thus making the DOE an "in and out" experiment wherein acceptable paint formulations may be derived from subsets of the known constituent pigments but not necessarily from some of each pigment.

Continuing with step 205 in the flow chart of FIG. 2, a number (x) of paint samples are formulated within the parameters or boundaries established on the P:B and $p_i$:P ratios. Each of the x paint samples is diverse with respect to the other. In other words, in the present example wherein P:B is assumed to remain constant, all of the sample paints have the same P:B; however, all such samples have different pigment ratios. In a full-factorial, two-level DOE, the number x of samples or runs is determined in accordance with the following relationship:

$$x = 2^n \qquad (2)$$

wherein is the number of pigments. The number x of paint samples formulated, however, may be less than $2^n$ in the case of a partial-factorial or fractional-factorial, two-level DOE.

Figures 3, 4:
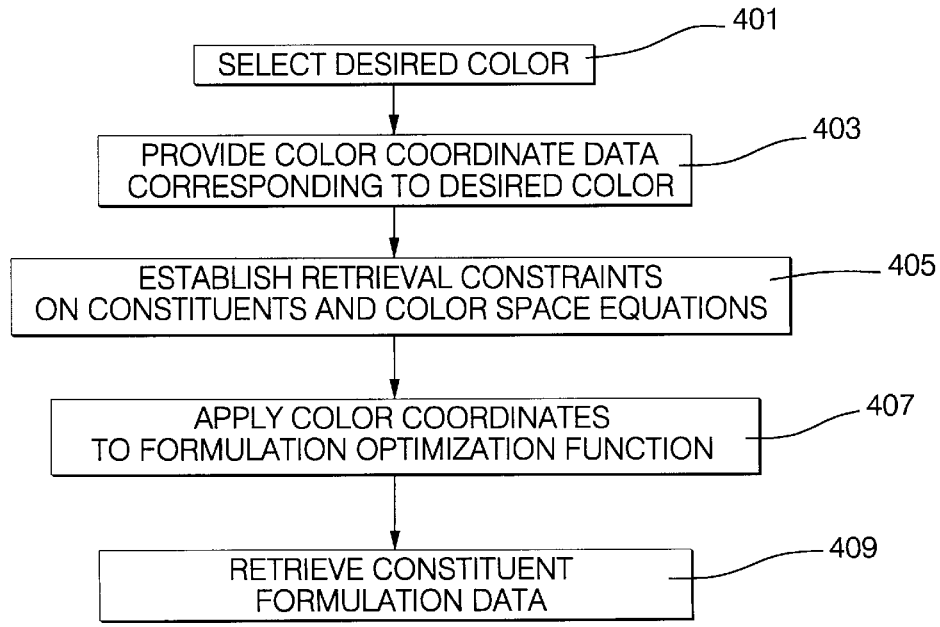
FIG. 3 is an exemplary data matrix for a two-level design of experiment including provisions for multi-angle color coordinate data.
FIG. 4 is a procedural flow diagram for retrieval of paint formulations from the color space model developed in accordance with the flow diagram of FIG. 2.

With supplemental reference now to FIG. 3, a matrix of paint samples S, constituents C (pigments only in the present example), and multi-angle color coordinates L*a*b* is illustrated. In the present example, only the pigments are treated as factors in the DOE so the constituents comprise the n pigments $C_1$ through $C_n$. However, in a broader DOE, the constituents may include the binder. In the full-factorial, two-level DOE, the number of paint samples is x as described above in relation to formula (2). Each row in the matrix corresponds to a paint sample $S_1$–$S_x$. The row groupings of constituents $C_1$ through $C_n$ therefore comprise what is herein termed as the constituent apportionment data or constituent apportionments. Likewise, the row groupings of the multi-angle L*a*b* color coordinates comprise what is herein termed as the color coordinate data or color coordinates. The constituent apportionments are diverse within the established parameters of the two-level DOE. That is to say, each row grouping of constituent (pigment) levels is different from al the other row groupings of constituent (pigment) levels in at least one of the constituent (pigment) levels. The color coordinates are measured using, in the present example, a multi-angle spectrophotometer as will be described in the next paragraph. In addition to the constituent apportionments at the DOE two levels, other constituent apportionments may be included. For example, it may be desirable to establish one or more sets of constituent apportionment data at pigment levels intermediate the established two levels of the DOE.

Once the paint samples are mixed, the paints are applied to test panels and allowed to dry as set forth in block 207 of the flow chart of FIG. 2. Each of the test panels is a physical representation of a paint formulatable from a combination of a group or set of constituents selected from the set of known constituents in accordance with the principles of a two-level DOE in the exemplary steps. Next at block 209, color measurement of each test panel is performed. Preferably, the measurements are performed with a spectrophotometer adapted to perform multi-angular measurements and store and transfer L*a*b* color data corresponding to the color attributes of the painted panels to a general purpose personal computer programmed for further use in developing the color space model. The multi-angular measurements are most critical when the pigment make-up comprises any of a variety of so called metallic particles for the reasons previously set forth. However, satisfactory results have been and may be obtained by single angle measurements. A preferred and generally accepted standard single-angle for measurement is substantially a 45 degree flash or specular angle. A spectrophotometer meeting the preferred capabilities of multi-angular measurements and data storage and transfer is the MA68 Multi-Angle Spectrophotometer available from X-Rites® Corporation having bi-directional data interface by way of a standard RS-232 port.

Figure 5:
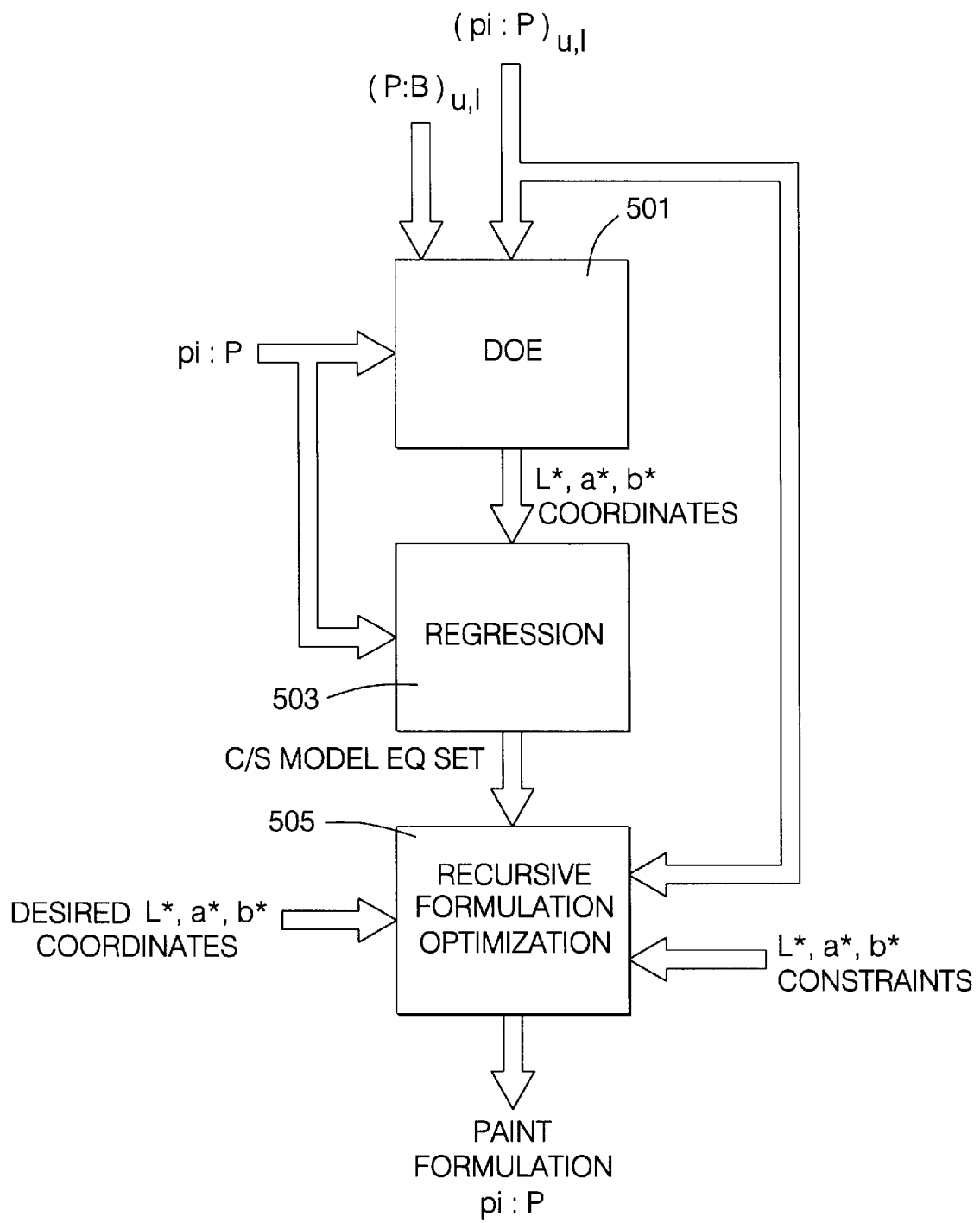
FIG. 5 is a block schematic of a complete design of experiment, color space model development and paint formulation determination in accordance with the present invention.

The preceding DOE steps are represented by block 501 of FIG. 5 wherein the experimental P:B and $p_i$:P levels, and the samples'$p_i$:P are DOE inputs. The DOE outputs are the color coordinates.

It is convenient at this point to plot the L*a*b* color coordinates associated with the samples into a graphical chromatic area and lightness scale. Preferably, only single-angle color coordinates are plotted and provide an adequate representation of the color space associated with the DOE data. A preferred single-angle for such use is substantially 45 degrees.

Continuing with the flow chart of FIG. 2, block 211 next represents computationally establishing a color space model based upon the measured color coordinates of the number of test panels. The main objective of the steps encompassed by block 211 is to determine the casual connection between the known constituents and the resultant color coordinates from the number of test panels and to build a model for retrieving constituent outputs for a predetermined set of color coordinate inputs. A variety of general techniques may be used in so establishing the color space model. For example, a preferred technique employs conventional multi-variable linear regression to construct a first-order linear model comprising a plurality of coupled equations. Alternate techniques include standard training of a neural network with input vectors corresponding to the color coordinates of the test panels, output vectors comprising the full set of constituents and target vectors corresponding to the respective test panel constituents. However, neural network derived models generally make use of numerous sets—far in excess of the number of samples associated with a two-level DOE—of input vectors in the training phase which may be overly burdensome in light of the necessity of providing correspondingly numerous sets of physical samples and measured color coordinate data.

In the preferred approach, linear regression analysis is performed using the multi-angle L*a*b* measurements and the pigment apportionments to derive regression constants (K) and factor coefficients (ki), where i designates the associated factor (pigment). In the present example, the color coordinates L*a*b* are designated as the regression dependent variables, and the constituents (pigments) $C_1$–$C_n$ are designated as the regression independent variables or factors. The regression apportions shares in each of the L*a*b* coordinates to each of the n factors (constituents) $C_1$–$C_n$ based on the x paint samples $S_1$–$S_x$ thereby providing a respective set of factor (pigment) coefficients and constant for each L*a*b* coordinate. An exemplary set of first-order regression equations expressed for the example of a 45 degree angular analysis for the L*a*b* coordinates appear below in general form:

$$L^*_{45} = k1_{L45}{}^*C_1 + k2_{L45}{}^*C_2 + k3_{L45}{}^*C_3 + k4_{L45}{}^*C_4 + k5_{L45}{}^*C_5 + K_{L45} \quad (3)$$

$$a^*_{45} = k1_{a45}{}^*C_1 + k2_{a45}{}^*C_2 + k3_{a45}{}^*C_3 + k4_{a45}{}^*C_4 + k5_{a45}{}^*C_5 + K_{a45} \quad (4)$$

$$b^*_{45} = k1_{b45}{}^*C_1 + k2_{b45}{}^*C_2 + k3_{b45}{}^*C_3 + k4_{b45}{}^*C_4 + k5_{b45}{}^*C_5 + K_{b45} \quad (5)$$

wherein the subscripts designate the L*a*b* coordinate and angle set for the coefficients ki and constants K. In total, for a complete three-angle L*a*b* first-order regression analysis, a set of nine first-order regression equations result in respective sets of n factor coefficients and a respective constant. A single-angle analysis would yield three first-order regression equations. The number of first-order regression equations will be equivalent to three times the number of angles in the analysis. The regression functions may be performed by any of a variety of well known commercially available software packages including, for example, general purpose spreadsheet applications such as Microsoft Excel, available from Microsoft Corporation.

The preceding regression steps are represented by block 503 of FIG. 5 wherein the color coordinates from the DOE and the samples'$p_i$:P are the regression inputs. The regression outputs are the color space model equation set including the constant and the coefficients for each equation.

With the color space model having been developed in the present embodiment as a plurality of first-order color space equations relating the various selected pigments to respective L*a*b* color coordinates, the next general objective presented is to provide therefrom the pigment apportionments which will result in a selected L*a*b* color coordinate. Generally it is desirable that the pigment apportionments are limited to within the factor levels or constituent parameters established for the model development. Such limitations will generally maintain the confidence levels of the model output to the confidence levels associated with the model development. The terminology "color space capability" as used herein shall be understood to mean rational color coordinates obtainable from paint formulated within certain constraints, though deviation from such constraints may also produce rational pigmentation apportionments yet at reduced confidence levels. The coupled nature of the color space equations is addressed by constraining the individual color space equations to respective desired color space coordinate values. The pigment apportionment formulations are derived from the color space equations which are recursively solved in accordance with an optimal solution which meets the various constraints and minimizes the deviation of the resultant color coordinate value of a selected one of the color space equations from the desired color space coordinate value.

With reference to the flow chart of FIG. 4, the general steps in a preferred process for retrieving pigment apportionment formulation data in accordance with the color space model is next described. Block 401 of the flow chart first requires selection or determination of a desired color and block 403 requires that the color be represented or expressed as a L*a*b* color coordinate. The desired color is to be provided in consistent color coordinate format (L*a*b* in the present example) as used in the model development, color space visualization graphical tools, and color measurement instrumentation previously described.

One preferred manner of selecting a desired color is to refer to a color space visualization graphical tool such as that described with respect to FIG. 6. In such a manner, a color may be selected from within a known color space as represented by a boundary substantially enclosing the points plotted from the color coordinates determined from the DOE performed with constituents from a known paint. A relatively high degree of informal confidence that a point selected from within such a graphical boundary is formulatable from the constituents of the known paint is afforded by such selection technique. And, any such formulation from the known constituents which results in a color within such a boundary meets constituent parameters used in the model development. Hence, the judicious selection of such constituent parameters (factor levels in the DOE) to ensure the desired performance characteristics pays dividends in the retrieval of paint formulations from the model. As an example, examination of the color space established by a DOE based around a blackish/purple paint is represented by the boundary 605 in the chromatic area and the distribution 605 of the corresponding L* coordinates on the lightness scale. Selection of a point within the boundary and differentiating the point into the corresponding a*,b* coordinates and then combining them with a desired L* coordinate from within the corresponding L* distribution on the lightness scale yields a set of L*a*b* color coordinates within the color space capability of the known pigments as constrained by the pigment parameters of the DOE.

Another preferred manner of selecting a desired color using a color space visualization graphical technique is played out in similar fashion. However, recognizing the desirability of maintaining a diverse supplier base, at least two known paints may provide for the 'same' color yet, in fact, achieve that result by way of diverse paint formulations. That is to say, at least some of the pigments are diverse as between the paints, and likely the binders are diverse also. In such a case, the actual practical color space which may be leveraged from a single paint color may be more limited than the color space which may be leveraged from any one of the two or more known paint formulations. In the example being described, two such known paints are assumed. In such a case, a separate DOE is run for each of the two paints and the resultant measured L*a*b* color coordinates represented graphically on a chromatic area and lightness scale as described. The boundaries 607 and 609 correspond to color space capabilities as derived from respective DOE and color space models developed in accordance with respective sets of known pigments of two diverse paint formulations of the same color. The intersecting chromatic and lightness coordinates represent a common color space capability between the two diverse paint formulations.

Alternative color selections may be made by examination of the physical painted panels which were produced for the DOE in development of the color space model. The panels may be used directly by referencing the corresponding L*a*b* color coordinate data which was measured in the steps of the DOE or by using the corresponding L*a*b* color coordinate data from two or more of the panels and formally or informally interpolating a desired paint color therebetween. Furthermore, a spectrophotometer may be used to measure a surface having a color of interest such as a panel from another vehicle, and the corresponding L*a*b* color coordinates compared graphically to historical and/or current colors or color space capabilities corresponding to known paint formulations which may indicate the feasibility of formulating a paint to match the measured color from one or more of the known paint formulations.

Selection of the desired color and provision of the corresponding L*a*b* coordinates having been accomplished, block 405 represents the establishment of constraints upon the constituents and color space equations for the retrieval of formulation data from the color space model. Preferably, the constituent constraints are consistent with the DOE factor levels Also, the color coordinates are preferably treated as constants in the retrieval of constituent apportionments from the model. Consequently, block 407 represents the application of the color attributes to the color space model and recursively modifying the constituent apportionments to provide an optimum solution to the coupled equations of the color space model while working within the constraints of the retrieval on the constituents and color space equations. The variables in such an optimization are therefore limited to the constituents, and the constants comprise the coefficients (k) and the constants (K). Rational solutions to the color space equations using the constraints consistent with the equations' development indicates that the color coordinates are within the color space capability of the constituents.

A preferred optimization is provided by any of a variety of well known commercially available software packages including, for example, general purpose spreadsheet applications such as Microsoft Excel, available from Microsoft Corporation. Microsoft Excel provides a Solver function which allows a multiplicity of coupled equations to be considered in providing optimal solutions therefor within certain predefined iterative and time execution limits and within certain variable and equation output manipulation limits. FIG. 7 illustrates an exemplary Excel worksheet used in optimizing a solution to a three-angle color space model characterized by nine color space model equations and five known constituents. The general forms of the color space model equations are contained as formulas in the cell range K10:K18 which reference other worksheet cells containing respective constants and coefficients as further described below. The desired formulation outputs comprising pigment ratios required for each pigment for three measurement angles are contained in cell range D2:H4, the values of which are the recursive variables iteratively changed in the optimization. The constraints placed upon the Solver are of two categories: pigment ratio constraints, arguments for which are located in cell range D6:H7; and, color space equation constraints, arguments for which are located in cell range J11:J18. The constants and coefficients of the color space model equations are located in cell ranges C10:C18 and D10:H18, respectively. The pigment ratio constraint arguments preferably correspond to the pigment ratio constraints used in the regression analysis to derive the color space model equations and are not varied by the Solver function. Similarly, the constants and coefficients are provided by the regression analysis and are not varied by the Solver function though they are referenced by cell addresses in the formulas for color space equations contained in cell range K10:K18, an example of which is set forth below for cell K10 containing the formula for the L*$_{25}$ coordinate color space equation:

$$i=C10+(D2*D10)+(E2*E10)+(F2*F10)+(G2*G10)+(H2*H10) \quad (6)$$

The color space equation constraint arguments, cell range J11:J18, correspond to the respective desired color space coordinates supplied and are not varied by the Solver function.

In the present example, the Solver is invoked to find an optimal solution to the color space equations which minimize the deviation of the value of the L*$_{25}$ color space model equation contained in cell K10. The values of the remaining color space model equations contained in cell range K11:K18 are constrained to the constraint arguments (desired L*a*b* values) entered into cell range J11:J18. Similarly, the values of the recursive variables (i.e. pigment ratios) contained in cell range D2:H4, are constrained to the constraint arguments (upper and lower ratio limits) entered into cell range D6:H7.

Figure 8:
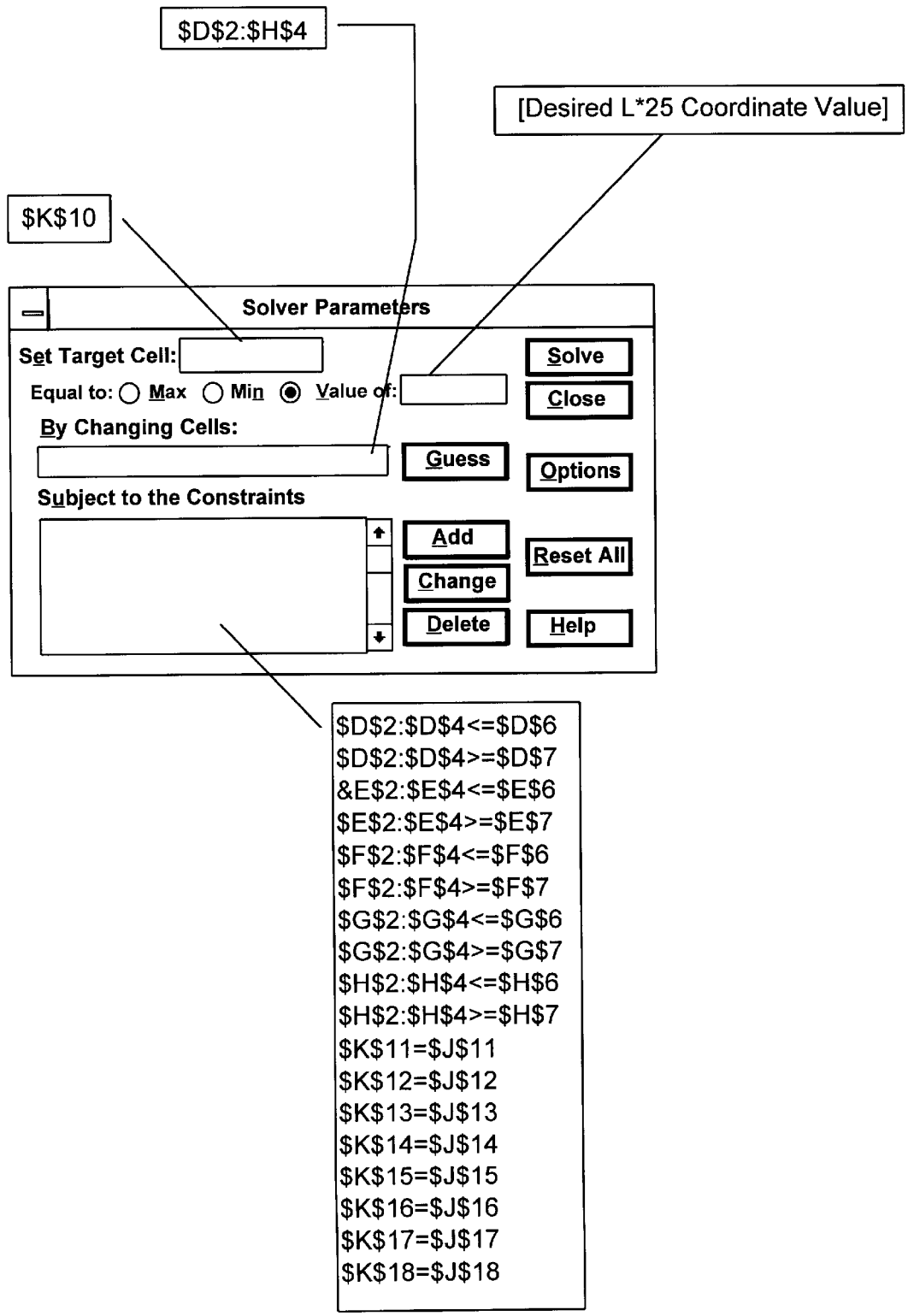

Implementation of the recursive optimization as described is set up and invoked by entering the respective constraint arguments (i.e. pigment constraints values and desired L*a*b* color coordinates) into the appropriate cells, entering the respective constants and coefficients of the color space model equations into the appropriate cells, and entering the general cell referenced formulas—such as formula (6) above—corresponding to respective color space model equations into the appropriate cells. Solver parameters are next entered by selecting Solver from the Tools drop down menu. Entries are then made into the input areas of the dialogue window which appears substantially as shown in FIG. 8. The target cell in the present example is entered as K10, the target value is entered as the desired $L^*_{25}$ color coordinate value, the changing cells are entered as cell range D2:H4, and the constraints are entered as logical statements limiting the pigment cell values to between the respective pigment constraint values and the color space model equation values, not including the target cell value, to the respective desired L*a*b* values as shown. Default values are used for Solver options but may be altered to suit the particular application.

After Solver has completed the optimization, the solution pigment ratios are output to cell range D2:H4, which corresponds to block 409 of FIG. 4. The solution will be indicated as feasible or not feasible. Feasible solutions verify that the desired color coordinates are within the capability of the constituents. Where the solution is indicated as not feasible, the desired color coordinates are not within the capability of the constituents. In such a case, it may be desirable to open up (i.e. broaden) the pigment constraints beyond those used in the color space model development in an attempt to extrapolate a pigment ratio solution albeit at a lesser confidence level that an acceptable paint formulation will result.

The preceding retrieval steps are represented by block 505 of FIG. 5 wherein the color space model equations, desired color coordinates, and $p_i$:P constraints are the inputs to the recursive formulation optimization. The output is the paint formulation including an indication of feasibility in light of the established constraints.

In the instance wherein the objective is to determine whether the desired color coordinates are within the color space capability of a known paint formulation, a feasible solution to a color space model developed as described from the known paint formulation indicates that the desired color coordinates are within the color space capability thereof. In fact the pigment ratio solution provides the respective pigment ratio mixture data for paint having the desired color coordinates. In the instance wherein the objective is to determine whether the desired color coordinates are within common color space capability of two or more known paint formulations, individual DOE, regressions and recursive formulation optimizations are performed for each such known paint. Feasible solutions from both runs indicate that the desired color coordinates are within the color space capability of the two or more known paint formulations and in fact provide the respective pigment ratio mixture data for paints having the desired color coordinates.

We claim:

1. method of determining a paint formulation for producing a paint characterized by desired color coordinates in a three-dimensional color space from a set of known constituents, the method comprising the steps:

providing a plurality of color coordinates, each of the color coordinates corresponding to a respective diverse apportionment of the known constituents;

performing regression of the color coordinates and the diverse apportionments of the known constituents to establish therefrom a set of interdependent equations having independent variables corresponding to the known constituents and dependent variables corresponding to the color coordinates;

providing the desired color coordinates; and, recursively solving the set of interdependent equations for values of the independent variables which substantially equate the dependent variables to the desired color coordinates, whereby the solved values of the independent variables comprise the paint formulation for producing the paint exhibiting the desired color coordinates.

2. The method of determining a paint formulation as claimed in claim 1, wherein the step of providing the plurality of color coordinates comprises:

providing a plurality of paint samples characterized by predetermined diverse apportionments of the known constituents; and, producing the respective color coordinates corresponding to each paint sample by a color measuring device.

3. A method of determining a paint formulation as claimed in claim 1 wherein the set of known constituents comprises constituents of a predetermined paint formulation.

4. A method of determining a paint formulation as claimed in claim 1 wherein the diverse apportionments of the constituents are predetermined such that the corresponding paint formulations satisfy predetermined physical properties.

5. A method of determining a paint formulation for producing a paint characterized by desired color coordinates in a three-dimensional color space from a set of known constituents, the method comprising the steps:

providing a number of paint samples, each paint sample characterized by respective diverse constituent apportionment data;

producing respective color coordinate data defining, for each paint sample, color position in a three-dimensional color space by a color measuring device;

relating the constituent apportionment data to the color coordinate data to derive a formulation model characterized by correlation of the known constituents to color attributes defining color positions in the three-dimensional color space;

applying color coordinate data corresponding to the select paint color to the formulation model to determine constituent apportionments corresponding to the select paint color; and, comparing the determined constituent apportionment data to predetermined constituent parameters wherein determined constituent apportionment data comprises the paint formulation for producing the paint exhibiting the desired color coordinates.

6. A method of determining paint formulations for producing paints characterized by color coordinates within a three-dimensional color space common among respective capabilities of a plurality of known paints formulated with respective sets of known constituents, the method comprising the steps:

providing for each known paint a plurality of color coordinates, each of the color coordinates corresponding to predetermined diverse apportionments of the respective set of known constituents, said predetermined diverse apportionments having been established in accordance with each respective constituent assuming one of a respective pair of apportionment levels, each respective pair of apportionment levels corresponding to limits of the corresponding constituent affecting the respective capability of the corresponding known paint;

performing for each known paint regressions of the corresponding color coordinates and diverse apportionments of the respective set of known constituents to establish therefrom corresponding sets of interdependent equations having independent variables corresponding to the respective known constituents and dependent variables corresponding to the respective color coordinates;

providing predetermined color coordinates; and, recursively solving each set of interdependent equations for values of the corresponding independent variables which substantially equate the corresponding dependent variables to the predetermined color coordinates, wherein the solved values for the respective independent variables comprise respective paint formulations for producing paint exhibiting the desired color coordinates, and wherein when each solved value is within the respective limits of the corresponding constituent, the respective paint formulations produce paints characterized by color coordinates within a three-dimensional color space common among respective capabilities of the plurality of known paints.

7. The method of determining paint formulations as claimed in claim 6, wherein the step of providing for each known paint the plurality of color coordinates comprises:

providing for each known paint a plurality of paint samples characterized by predetermined diverse apportionments of the corresponding known constituents; and, producing the respective color coordinates corresponding to each paint sample by a color measuring device.

* * * * *